Dec. 26, 1950      G. V. POWERS      2,535,953

CUTOFF VALVE

Filed Jan. 16, 1945

Inventor

G. V. Powers

By Wilfred E. Lawson

Attorney

Patented Dec. 26, 1950

2,535,953

UNITED STATES PATENT OFFICE 2,535,953

CUTOFF VALVE

George V. Powers, Great Bend, Kans.

Application January 16, 1945, Serial No. 573,003

1 Claim. (Cl. 251—63)

This invention relates to a straight-through valve and it is primarily an object of the invention to provide a valve of this kind which is corrosion-proof and wherein there is a straight or direct flow through the valve when open and which flow is unrestricted by friction or reduction of area.

A still further object of the invention is to provide a valve of this kind of a gate type and wherein is provided an effective means for readily moving the valve member or stem into either open or closed position.

The invention consists in the details of construction and in the combination and arrangement of the several parts of my improved valve whereby certain important advantages are attained and the article rendered simpler, less expensive and otherwise more convenient and advantageous for use, as will be hereinafter more fully set forth.

The novel features of my invention will hereinafter be definitely claimed.

In order that my invention will be the better understood, I will now proceed to describe the same with reference to the accompanying drawings, wherein.

Figure 1:
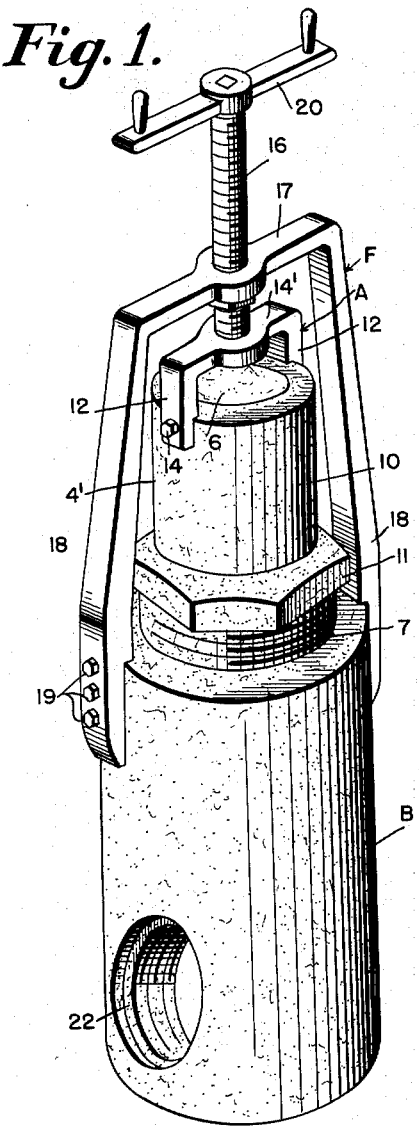
Figure 1 is a view in perspective of a valve constructed in accordance with the present invention.
Figure 2:
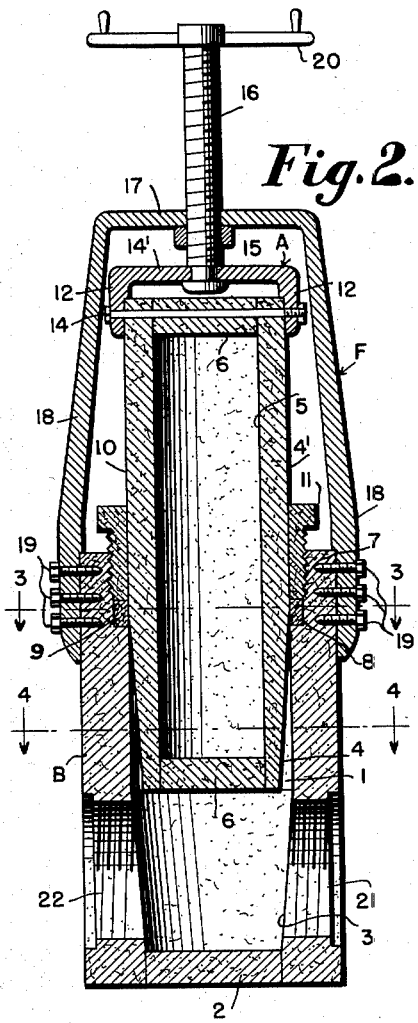
Figure 2 is a vertical longitudinal section through the valve structure.
Figure 3:
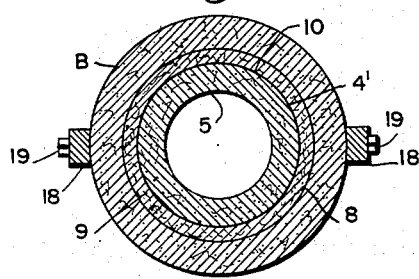
Figure 3 is a transverse section on the line 3—3 of Figure 2.
Figure 4:
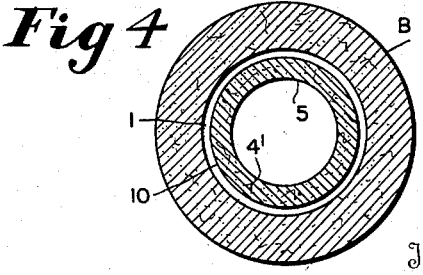
Figure 4 is a transverse section on the line 4—4 of Figure 2.

As herein comprised the valve embodies a valve body B of a non-corrosive material and which is cylindrical in form and initially has a bore 1 extending entirely therethrough. One end portion of the bore 1 is closed by a plug 2 of suitable non-corrosive material and the adjacent portion of said bore 1 is tapered, as at 3, to provide a seat for the tapered end portion 4 of the elongated valve member or stem 4'. This member 4' is also of non-corrosive material and is cylindrical in form and has a bore 5 normally open at both ends. The member 4' is tubular with the extremities of the bore 5, closed by the plug 6, of the same material as the member or stem 4'.

The outer or upper end portion of the bore 1 of the body B is enlarged, as at 7, whereby is provided an internal and outwardly facing shoulder 8 with which engages the packing 9 surrounding the member or stem 4' for contact with the outer straight portion 10 thereof which extends from the outer end of the valve member or stem 4' to the tapered inserted end portion 3.

Threading into the enlarged portion 7 of the bore 1 of the member B is a packing gland 11 of non-corrosive material, said gland closely but freely surrounding the outer straight portion 10 of the valve member or stem 4'. This gland 11 provides means to compress the packing 9 to assure the same having requisite effective contact with the periphery of the straight portion 10 of the valve member or stem 4'.

Straddling the upper or outer end portion of the valve member or stem 4' is a yoke A substantially in the form of an inverted U and having relatively short side arms 12 which overlie the upper or outer end portion of the valve member or stem 4' and held thereto by a long bolt 14 which extends through the arms 12, the valve member or stem 4' and the adjacent plug 6.

The intermediate member 14' of the yoke A at the axial center of the valve member or stem 4' has in swivel connection therewith, as at 15, an end portion of a screw shaft 16 which threads through the intermediate member 17 of a frame F also in the form of an inverted U. The side arms 18 of the frame F have their free extremities overlying the end portion of the body B into which the valve member or stem 4' enters and are securely held to the body B by lag screws 19, or the like. The side arms 18 are of a length sufficient to allow full opening movement of the valve member or stem 4' which is obtained upon requisite rotation of the screw shaft 16. As herein embodied, the outer extremity of this shaft 16 carries an operating handle 20.

The end portion of the body B having the tapered bore 3 is provided with the diametrically opposed openings 21 and 22, the opening 21 being adapted for communication with an inlet line and the opening 22 for communication with an outlet line. When the valve member or stem 4' is in fully opened position, it is entirely beyond the aligned openings 21 and 22 so that fluid will have flow straight through the body unrestricted by friction or area and a further material advantage is provided as a scraper can be passed through the line and valve body when it becomes necessary to clean sediment out of the line. This is something that cannot be done in a globe valve.

The frame F, the yoke A, and concomitant parts are of metal, preferably steel.

From the foregoing description it is believed to be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

In a cutoff valve, a vertically elongated partially cylindrical body having a downwardly tapering bore closed at its lower end and opening through the top end of said body, said body having oppositely disposed screw-threaded ports opening through the same slightly above the closed bottom of said bore, a vertically elongated partially cylindrical hollow valve element slidably engaged in said bore and having its lower end portion tapered to conform to the taper of the like end of the bore, said body having a screw-threaded counterbore it its top end concentrically related to the upper end of said bore and constituting a packing gland about said valve element, a nut threaded in said counter-bore to compress a packing into contact with said valve element, an inverted substantially U-shaped bracket straddled over the top end of said body and having the ends of its side portions secured at opposite sides of the top end of the body, an inverted substantially U-shaped yoke straddled over the top end of said valve element and having its side portions attached thereto, and an operating screw threaded downwardly through the top portion of said bracket and having its lower end in swivelled connection with said yoke.

GEORGE V. POWERS.

REFERENCES CITED

The following references are of record in the file of this patent:

UNITED STATES PATENTS

| Number | Name | Date |
| --- | --- | --- |
| 613,041 | Kamerer | Oct. 25, 1898 |
| 1,016,167 | McCulloch | Jan. 30, 1912 |
| 1,341,146 | Murray | May 25, 1920 |
| 1,932,471 | McKellar | Oct. 31, 1933 |
| 2,000,853 | Lange | May 7, 1935 |
| 2,001,271 | Smith | May 14, 1935 |
| 2,060,571 | Hanson | Nov. 10, 1936 |
| 2,208,394 | Scherer | July 16, 1940 |

FOREIGN PATENTS

| Number | Country | Date |
| --- | --- | --- |
| 646,140 | France | July 10, 1928 |